US012748645B2

(12) United States Patent
Nuthakki et al.

(10) Patent No.: US 12,748,645 B2
(45) Date of Patent: Sep. 29, 2026

(54) PORT CONFIGURATION VERIFICATION SYSTEM

(71) Applicant: Dell Products L.P., Round Rock, TX (US)

(72) Inventors: Krishna Deepak Nuthakki, Bangalore (IN); Scott Rowlands, Cumming, GA (US); Arieh Don, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/007,740

(22) Filed: Jan. 2, 2025

(65) Prior Publication Data

US 2026/0186879 A1 Jul. 2, 2026

(51) Int. Cl.

*G06F 11/07* (2006.01)
*G06F 3/06* (2006.01)
*H04L 41/0631* (2022.01)

(52) U.S. Cl.

CPC ........ *G06F 11/0727* (2013.01); *G06F 3/0607* (2013.01); *G06F 3/0635* (2013.01); *G06F 3/0664* (2013.01); *G06F 11/0793* (2013.01); *H04L 41/0631* (2013.01)

(58) Field of Classification Search

CPC .... G06F 3/0607; G06F 3/0635; G06F 3/0664; G06F 11/0727; G06F 11/0793; H04L 41/0631

See application file for complete search history.

(56) References Cited

U.S. PATENT DOCUMENTS 11,422,704 B2 * 8/2022 Adams .................... G06F 3/061
11,630,581 B2 * 4/2023 Crowley ............... G06F 3/0613 711/154
11,720,254 B2 * 8/2023 Nuthakki ............. G06F 3/0653 711/154

* cited by examiner

*Primary Examiner* — Joseph R Kudirka

(74) *Attorney, Agent, or Firm* — Krishnendu Gupta; Nikhil Patel

(57) ABSTRACT

One or more aspects of the present disclosure relate to verifying port connectivity in storage environments. A storage array obtains Fabric Device Management Interface (FDMI) metadata from a switch containing information about World Wide Names (WWNs) associated with host bus adapter (HBA) ports. The storage array analyzes the metadata to determine multiple WWNs associated with the same physical HBA port and examines masking information to identify array ports masked to those WWNs. The system detects connectivity configuration issues, including single points of failure where redundant connectivity appears to exist, non-uniform masking patterns across virtual WWNs sharing a physical port, and fan-in conditions where excessive array port connections create performance bottlenecks. Upon detecting these issues, the system initiates corrective actions and provides warnings to prevent uneven input/output (IO) load distribution and improve storage network reliability.

18 Claims, 5 Drawing Sheets

PORT CONFIGURATION VERIFICATION SYSTEM

BACKGROUND

Storage networks commonly employ N-Port ID Virtualization (NPIV) technology in virtualized environments to enable multiple virtual machines to share physical Host Bus Adapter (HBA) ports while maintaining distinct identities through unique World Wide Names (WWNs). In traditional storage architectures, each physical HBA port is associated with a single WWN for communication with storage arrays through Fibre Channel switches. NPIV extends this capability by allowing multiple virtual WWNs to be associated with a single physical HBA port, facilitating granular tracking and management of input/output (IO) operations at the virtual machine level. Storage arrays and switches utilize Fabric Device Management Interface (FDMI) metadata to maintain information about connected devices, including details about HBA ports, operating systems, and hardware configurations. This infrastructure supports essential storage management functions such as switch zoning and storage array masking, which control access and connectivity between hosts and storage resources.

SUMMARY

One or more aspects of the present disclosure relate to verifying port connectivity in storage environments. In embodiments, Fabric Device Management Interface (FDMI) metadata can be obtained by a storage array from a switch. The FDMI metadata includes information about World Wide Names (WWNs) associated with host bus adapter (HBA) ports. Based on the FDMI metadata, it is determined that multiple WWNs are associated with a same physical HBA port. Masking information is analyzed to identify array ports masked to the multiple WWNs. Based on the analysis, a connectivity configuration issue associated with the multiple WWNs can be detected. A corrective action can be initiated in response to detecting the connectivity configuration issue.

In embodiments, it can be determined that the multiple WWNs are masked to a number of array ports that exceed a predetermined threshold.

In embodiments, a single point of failure (SPoF) condition where redundant connectivity appears to exist due to the multiple WWNs due to the multiple WWNs being associated with the same physical HBA port can be identified.

In embodiments, non-uniform masking where different WWNs associated with the same physical HBA port are masked to different numbers of array ports can be identified.

In embodiments, a fan-in condition where the multiple WWNs associated with the same physical HBA port are masked to multiple array ports creating excessive load on the physical HBA port can be identified.

In embodiments, a warning message indicating the detection of a single point of failure condition can be generated.

In embodiments, a remasking operation can be initiated to establish uniform masking across the multiple WWNs associated with the same physical HBA port.

In embodiments, a mapping between virtual WWNs and their corresponding physical HBA ports can be determined based on the FDMI metadata.

In embodiments, input/output (IO) operations from each WWN can be monitored to track performance metrics for virtual machines sharing the same physical HBA port.

In embodiments, masking configurations across multiple physical HBA ports can be compared to identify inconsistent masking patterns.

Other technical features may be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts throughout the different views. The drawings are not necessarily to scale, emphasis instead being placed upon illustrating the embodiments' principles.

DETAILED DESCRIPTION

In virtualized storage environments, N-Port ID Virtualization (NPIV) enables multiple virtual machines to share physical Host Bus Adapter (HBA) ports by associating multiple World Wide Names (WWNs) with a single physical port. While this capability allows for granular tracking of input/output (IO) operations from different virtual machines, it creates significant challenges in storage management. Storage administrators traditionally treat each WWN as representing a distinct physical port when configuring switch zoning and storage array masking, unaware that multiple WWNs may share the same physical HBA port.

This misconception leads to several critical issues. First, when multiple WWNs from the same physical port are masked to different array ports, it creates a false appearance of redundancy while maintaining a single point of failure. Second, wide zoning resulting from masking multiple WWNs to numerous array ports increases system recovery time following network reconfigurations. Third, fan-in conditions arise when multiple WWNs associated with a single physical port are masked to multiple array ports, potentially overwhelming the host port with excessive read commands and return data.

Embodiments of the present disclosure leverage Fabric Device Management Interface (FDMI) metadata from switches to identify WWNs associated with the same physical HBA port. By analyzing this metadata alongside masking information, storage arrays can now detect connectivity configuration issues, including single points of failure, non-uniform masking patterns, and potential performance bottlenecks. This capability enables storage arrays to warn administrators of problematic configurations and initiate corrective actions to ensure uniform connectivity and optimal performance across virtualized environments.

Figure 1:
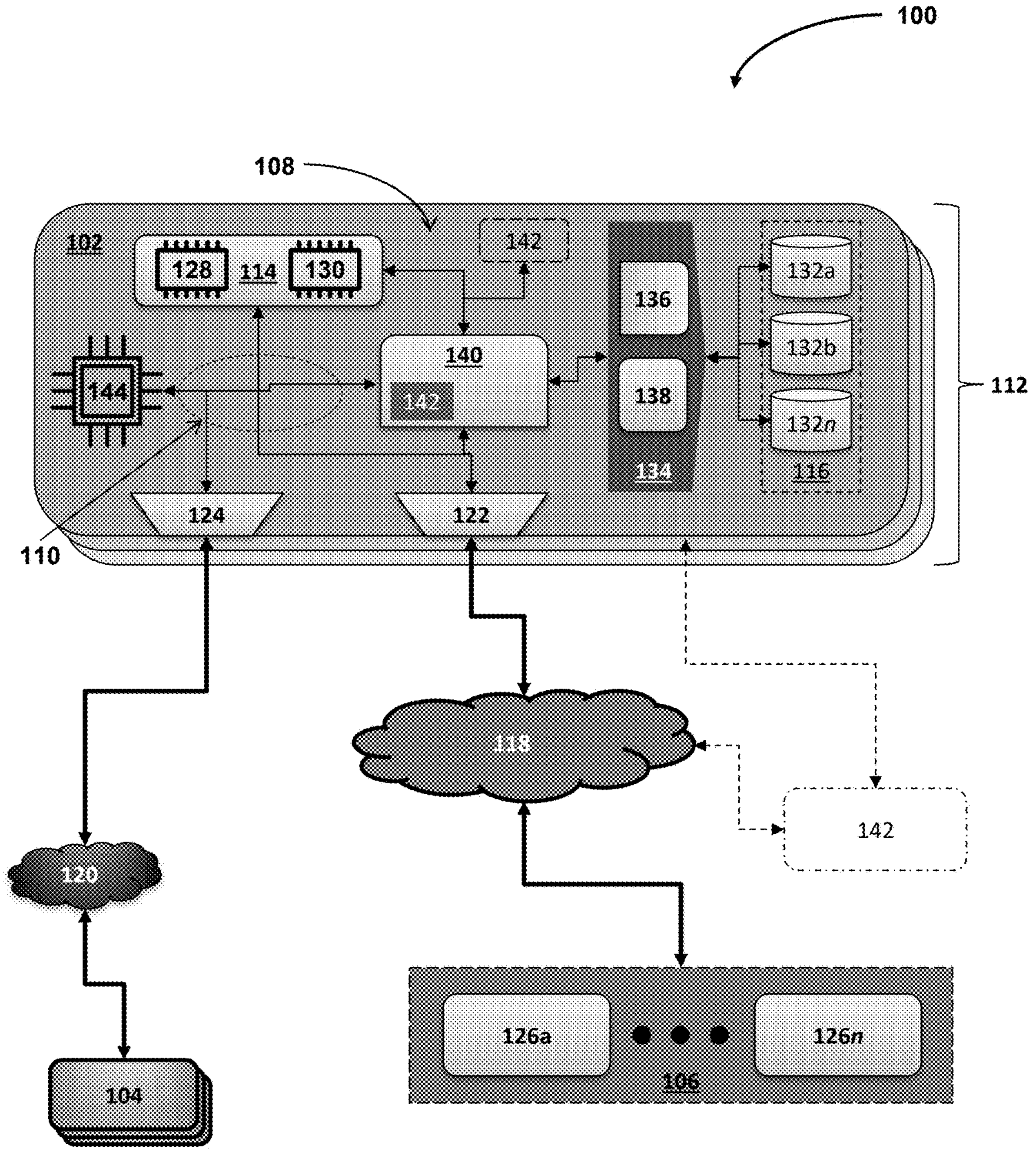
FIG. 1 illustrates a distributed network environment in accordance with embodiments of the present disclosure.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110 like Fibre channels, busses, and communication modules that communicatively couple the components 108. Further, the distributed network environment 100 can define an array cluster 112, including the storage array 102 and one or more other storage arrays.

In embodiments, the storage array 102, components 108, and remote system 104 can include a variety of proprietary or commercially available single or multi-processor systems (e.g., parallel processor systems). Single or multi-processor systems can include central processing units (CPUs), graphical processing units (GPUs), and others. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), an Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. The communication nodes can also include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126*a-n*, running one or more applications. The applications can require one or more of the storage array's services. Accordingly, each application can send one or more input/output (IO) messages (e.g., a read/write request or other storage service-related request) to the storage array 102 over the network 118. Further, the IO messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache IO messages and their respective data payloads. Additionally, the memory 114 can include local memory (LM 130) that stores instructions that the storage array's processors 144 can execute to perform one or more storage-related services. For example, the storage array 102 can have a multi-processor architecture that includes one or more CPUs (central processing units) and GPUs (graphical processing units).

In addition, the storage array 102 can deliver its distributed storage services using persistent storage 116. For example, the persistent storage 116 can include multiple thin-data devices (TDATs) such as persistent storage drives 132*a-n*. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102 can include a device interface (DI 134) that manages access to the array's persistent storage 116. For example, the DI 134 can include a disk adapter (DA 136) (e.g., storage device controller), flash drive interface 138, and the like that control access to the array's persistent storage 116 (e.g., storage devices 132*a-n*).

Likewise, the storage array 102 can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126*a-n*) remote/distributed storage services by virtualizing the storage array's memory/storage resources (memory 114 and persistent storage 116, respectively).

In embodiments, the storage array 102 can also include a controller 142 (e.g., management system controller) that can reside externally from or within the storage array 102 and one or more of its components 108. When external from the storage array 102, the controller 142 can communicate with the storage array 102 using any known communication connections. For example, the communications connections can include a serial port, parallel port, network interface card (e.g., Ethernet), etc. Further, the controller 142 can include logic/circuitry that performs one or more storage-related services. For example, the controller 142 can have an architecture designed to manage the storage array's computing, processing, storage, and memory resources as described in greater detail herein.

Figure 2:
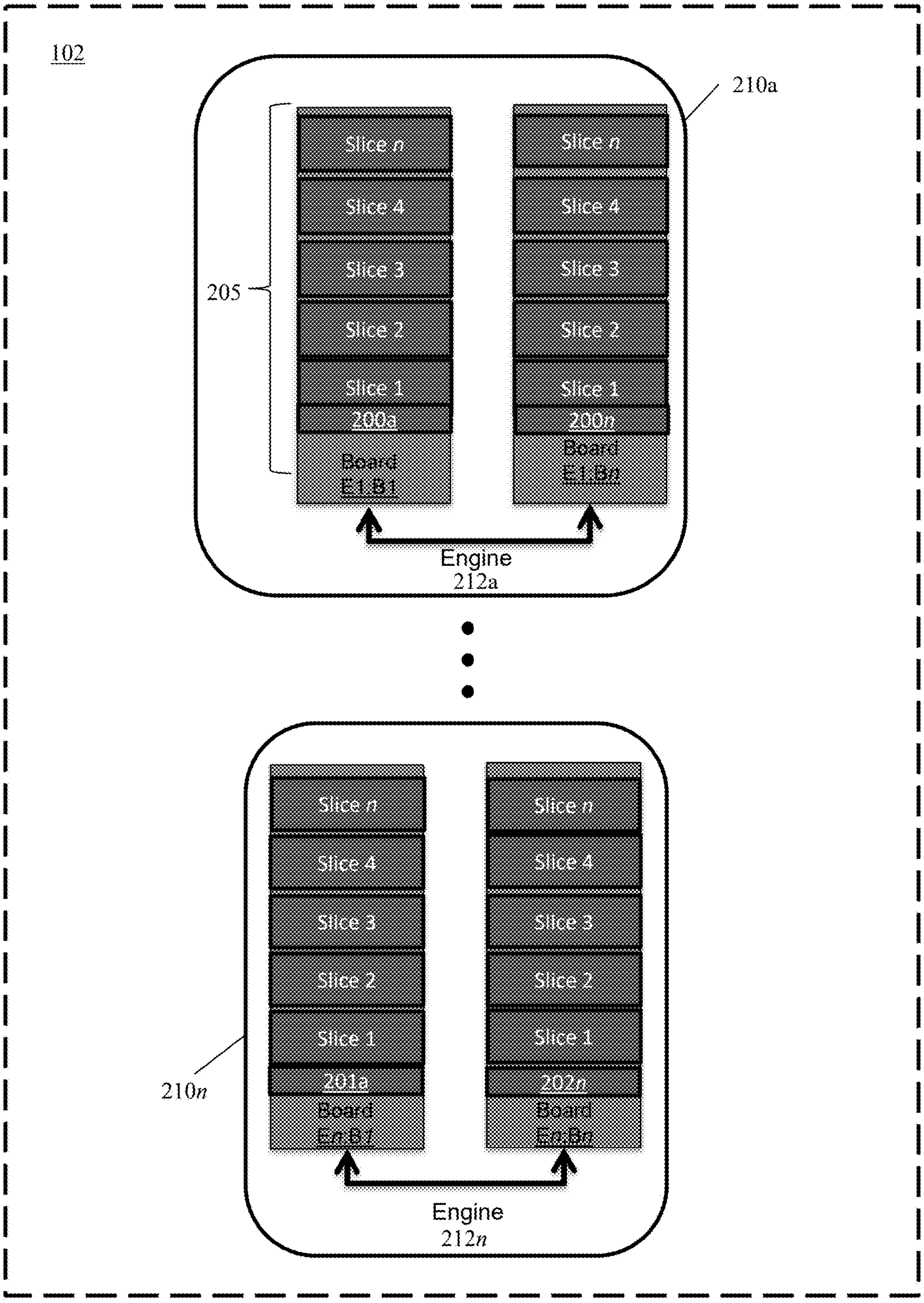
FIG. 2 is a block diagram of engines of a storage array, including director boards, in accordance with embodiments of the present disclosure.

Regarding FIG. 2, the storage array 102 includes engines 212*a-n* that deliver storage services. Each engine 212*a-n* has hardware circuitry or software components required to perform the storage services. Additionally, the array 102 can house each engine 212*a-n* in one or more of its shelves (e.g., housing) 210*a-n* that interface with the array's cabinet or rack (not shown).

In embodiments, each engine 212*a-n* can include director boards (boards) E1:B1-E1:Bn, En:B1-En:Bn. The boards E1:B1-E1:Bn, En:B1-En:Bn can have slices 205, each comprising hardware or software elements that perform specific storage services. Each board's slices 1-n can correspond to or emulate one or more of the storage array's components 108 described in FIG. 1. For example, each board's Slice 1 can correspond to or emulate the EDS 140 or controller 142 of FIG. 1. In embodiments, the slices 2-n can emulate one or more of the array's other components 101. Further, the boards B1-n can include memory 200*a-n*-201*a-n*, respectively. The memory 200*a-n*-201*a-n* can be dynamic random-access memory (DRAM).

In embodiments, each emulated EDS 140 (collectively "EDS 140") can provision its respective board with memory from the array's global memory 128. For example, the EDS 140 can uniformly carve out at least one global memory section into x-sized memory portions 200*a-n*-201*a-n*. Further, the EDS 140 can size each global memory section or the x-sized memory portions 200*a-n*-201*a-n* to store data structure filters like cuckoo filters. The EDS 140 can size each global memory section or the x-sized portions based on an IO workload's predicted metrics related to the amount and frequency of sequential IO write patterns. For instance, the predicted metrics can define the amount of data the x-sized memory portions 200*a-n*-201*a-n* can be required to store.

Figure 3:
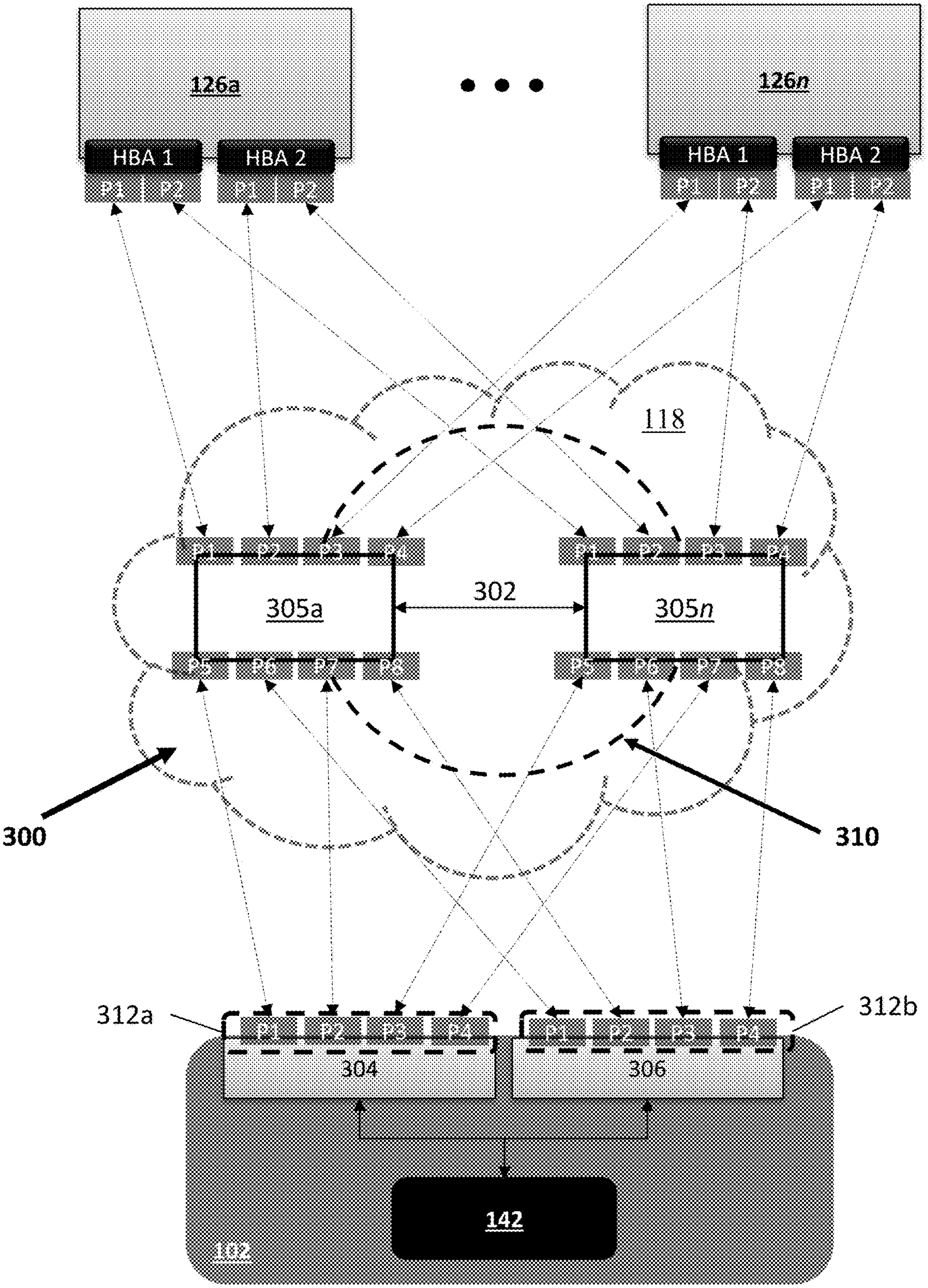
FIG. 3 is a block diagram of a communications network in accordance with embodiments of the present disclosure.

Regarding FIG. 3, a network (e.g., a storage area network) 118 can include one or more interconnected nodes (e.g., switches) 305*a-n* that define a structure and flow of information between devices on the network 118. In embodiments, the network can interconnect the nodes 305*a-n* using links 310. The links 310 can allow the nodes 305*a-n* to exchange messages using one or more communication protocols. The communications protocols can define a method (e.g., rules, syntax, semantics, and the like) by which the nodes 305*a-n* can pass messages and signals to other networked devices. Further, the protocol can define a communications synchronization process and error recovery methods. The network 118 can implement the protocol using hardware, software, or a combination of both. The protocol's rules, syntax, and semantics can include, e.g., a circuit switching, message switching, or packet switching technique. In embodiments, the nodes 305*a-n* can comprise networking hardware such as computing nodes (e.g., computers), servers, networking hardware, bridges, switches, hubs, and the like.

For example, the nodes 305*a-n* can correspond to Fibre Channel (FC) switches connected via an inter-switch link (ISL) 302. The ISL 302 allows communication and data transfer between switches, creating larger fabric topologies and providing redundancy. ISLs are typically high-speed links that carry traffic between switches, allowing devices connected to different switches to communicate with each other as if they were on the same switch. In the context of SAN FC Zoning, ISLs are crucial in connecting multiple switches to form a larger, more flexible network infrastructure.

The network 118 can arrange the nodes 305*a-n* to define one or more of a Chain Network (CHN), Y-Network (YN), Wheel Network (WN), Circle Network (CIRN), All-Channel Network (ACN) such as a Star Network, and the like. In a CHN, the nodes 305*a-n* have a hierarchical relationship (e.g., topology) that requires communications to flow through a formal chain. In a YN, the nodes 305*a-n* have a topology resembling an upside-down 'Y' (e.g., information flows upward and downward through the hierarchy). In a WN, data flows to and from a networked device (e.g., array 102). In a CIRN, the nodes 305*a-n* have a topology that restricts the flow of information to/from one node of the nodes to an adjacent node (e.g., a neighboring node). In embodiments, each node can have at most two adjacent nodes. In an ACN, the nodes 305*a-n* have a structure that allows communications to flow upward, downward, and laterally among each node. As illustrated, the network 118 can have an arrangement 300 consistent with an ACN. In embodiments, the network 118 can define one or more communication paths between the array 102 and hosts 1226*a-n*.

In embodiments, hosts 126*a-n* can connect to the network (e.g., SAN) 119 using Host Bus Adapters (HBAs) (e.g., respective HBAs 1-2) that are substantially similar to Network Interface Cards (NICs) in Ethernet networks. Each HBA (respective HBAs 1-2) includes ports P1-2 that are assigned unique World Wide Names (WWNs). The HBA ports P1-2 can connect to switch ports (e.g., ports P1-4 of switches 305*a-n*) via Fibre Channel links.

In embodiments, FC switches (e.g., switches 305*a-n*) can include multiple ports P1-8, each with its own WWN. The switches 305*a-n* can include switch host ports P1-4 connected to hosts. The switches 305*a-n* can also include switch storage ports P5-8 connected to one or more storage arrays (e.g., the storage array 102). Further, the switches 305*a-n* can be interconnected using Inter-Switch Links (ISLs) for redundancy and expanded connectivity.

In embodiments, a storage array 102 can include director boards 304/306 (e.g., substantially like director boards En:Bn of FIG. 2), each including a small input/output (IO) card (SLIC) 312*a-b*. Each SLIC can include multiple FC ports (e.g., ports P1-4) connected to corresponding switch storage ports P5-8 of respective switches 305*a-n*. Like other components (e.g., ports) of the network 118, the FC ports P1-4 on each SLIC 312*a-b* are assigned World Wide Names (WWNs). The SLICs 312*a-b* provide an interface between the storage array 102 and the external fabric corresponding to the network 118. Accordingly, the SLICs 312*a-b* allow the storage array 102 to connect to multiple FC switches (e.g., the FC switches 305*a-n*).

In embodiments, WWNs are unique identifiers in Fibre Channel networks, similar to IP addresses in Ethernet networks. Each device (e.g., HBA port, switch port, storage array port) is assigned a unique WWN. The WWNs can identify each device and port in the SAN 118. Additionally, the WWNs can be used to create logical zones that define which devices can communicate with each other. Specifically, zoning techniques use WWNs to create logical groups of devices that are allowed to communicate. Further, networked devices (e.g., the hosts 126*a-n*, FC switches 305*a-n*, and storage array 102) on the SAN 118 can implement multipathing techniques that use the WWNs to identify and manage multiple paths between the networked devices. Using WWNs, SAN administrators can precisely control and manage connectivity, security, and resource allocation in the Fibre Channel network, ensuring that only authorized devices can communicate and access specific resources.

In embodiments, the storage array 102 can include a controller 142 configured to obtain and analyze Fabric Device Management Interface (FDMI) metadata from switches 305*a-n* in the storage network 118. The controller 142 retrieves detailed FDMI metadata containing information about World Wide Names (WWNs) and their associations with physical host bus adapter (HBA) ports, including operating system details, manufacturer information, model numbers, serial numbers, and port numbers.

The controller 142 can process this FDMI metadata to establish mappings between virtual WWNs and their corresponding physical HBA ports. By analyzing these mappings alongside masking information, the controller can identify array ports that are masked to multiple WWNs associated with the same physical port.

In embodiments, masking information in storage systems defines which host WWNs can access specific array ports. In traditional configurations, a physical host port (e.g., ports P1-2 of HBAs 1-2 of hosts 126*a-n*) is typically masked to a predetermined number of array ports (e.g., ports P1-4 of director boards 304/306) based on user requirements.

In NPIV environments, masking becomes more complex as multiple virtual WWNs can be associated with a single physical HBA port. For example, if a host has three virtual WWNs (VM1, VM2, and VM3) on one physical port, each virtual WWN can be masked to different array ports. One virtual WWN might be masked to ports 1, 2, and 3, while another virtual WWN from the same physical port could be masked to ports 5, 6, and 7, and a third to ports 200, 300, and 400.

The storage array traditionally processes this masking information without awareness that these WWNs share the same physical port. This can lead to situations where the storage admin builds the masking database completely unaware that some WWNs are virtual, while the host admin configures virtual WWNs without knowledge of where the storage admin places the ports.

Non-uniform masking patterns can emerge where different virtual WWNs from the same physical HBA port are masked to varying numbers of array ports. For instance, one virtual WWN might be masked to three array ports while another virtual WWN on the same physical port is only masked to two array ports.

The masking information becomes particularly critical in large environments with thousands of servers and tens of thousands of VMs, where maintaining consistent masking patterns is essential for manageability. Storage and host administrators typically strive for uniformity in masking configurations to avoid complexity in managing numerous variations across the environment.

When combined with FDMI metadata analysis, the masking information enables the controller 142 to identify potential configuration issues, such as cases where the cumulative number of masked array ports for virtual WWNs exceeds recommended thresholds for a single physical port or where inconsistent masking patterns exist across virtual WWNs sharing the same physical port.

When analyzing connectivity configurations, the controller 142 performs several key functions. It evaluates masking patterns to determine if the number of array ports masked to WWNs from a single physical HBA port exceeds predetermined thresholds. The controller 142 also examines masking configurations across multiple physical HBA ports to identify inconsistent or non-uniform masking patterns that could impact system performance.

In embodiments, connectivity configurations in storage systems encompass the relationships between host WWNs, physical HBA ports, and array ports in NPIV environments. In a typical configuration, multiple virtual WWNs can be associated with a single physical HBA port, enabling individual virtual machines to have dedicated WWNs for their IO operations.

The physical connectivity involves host servers 126*a-n* connecting to storage arrays (e.g., the storage array 102) through HBA ports (e.g., ports P1-2 of HBAs 1-2 of hosts 126*a-n*), where each physical port can support multiple virtual WWNs through NPIV. These configurations become complex when virtual WWNs from the same physical port are connected to different array ports (e.g., ports P1-4 of director boards 304/306), potentially creating various connectivity patterns.

A critical aspect of connectivity configurations is the relationship between physical paths and virtual WWNs. When multiple WWNs share the same physical HBA port, they inherently share the same physical connectivity path to the storage array. This sharing can create scenarios where what appears to be redundant connectivity through multiple WWNs is dependent on a single physical connection.

Switch zoning is integral in connectivity configurations, determining which host ports can communicate with which array ports. When virtual WWNs from the same physical port are zoned to multiple array ports, it can result in broader zoning configurations that affect system recovery time during SAN reconfigurations.

The connectivity configuration also encompasses fan-in scenarios, where multiple virtual WWNs from a single physical port are configured to communicate with different array ports. This can create situations where the physical port must handle a concentrated load of returning data from multiple array ports, potentially exceeding its processing capabilities.

In large-scale environments with thousands of servers and virtual machines, connectivity configurations typically aim for uniformity to maintain manageability. This means that when a physical HBA port exports a certain number of virtual WWNs, the connectivity pattern for these WWNs should be consistent across different physical ports to ensure a balanced IO load distribution.

The controller 142 can analyze these connectivity configurations using FDMI metadata to identify potential issues such as single points of failure, non-uniform masking patterns, and excessive fan-in conditions. This analysis enables the system to maintain appropriate connectivity patterns while preventing configurations that could impact system performance or reliability.

The controller 142 can implement detection logic for various connectivity configuration issues. It identifies single points of failure (SPoF) by recognizing when multiple WWNs associated with the same physical HBA port create an illusion of redundant connectivity. The controller 142 can also detect fan-in conditions where multiple WWNs from a single physical port are masked to different array ports, potentially creating excessive load on the physical HBA port.

Upon detecting configuration issues, the controller 142 initiates appropriate corrective actions. These actions may include generating warning messages to alert system administrators about detected SPOF conditions or non-uniform masking configurations. The controller 142 can also initiate remasking operations to establish uniform masking across multiple WWNs associated with the same physical HBA port.

In embodiments, the controller 142 can maintain performance monitoring capabilities by tracking input/output (IO) operations from each WWN. This enables the controller 142 to gather performance metrics for virtual machines sharing the same physical HBA port. The controller 142 uses this information to support the implementation of service levels and performance limits on a per-VM basis, helping prevent individual VMs from monopolizing physical port resources.

In virtualized environments with multiple VMs using NPIV, the controller 142 can ensure proper management of virtual WWNs by treating them as extensions of their physical HBA ports rather than independent physical ports. This approach helps maintain appropriate zoning configurations and prevents issues arising from overly broad switch zoning, which could otherwise lead to increased recovery times following SAN reconfigurations or Registered State Change Notifications (RSCNs).

The controller's functionality is particularly valuable in large-scale environments where manual tracking and configuration of thousands of WWNs across numerous physical ports would be impractical. By automating the detection and management of NPIV-related connectivity issues, the controller 142 helps maintain system stability and performance while reducing the likelihood of misconfigurations that could impact service availability.

Figure 4:
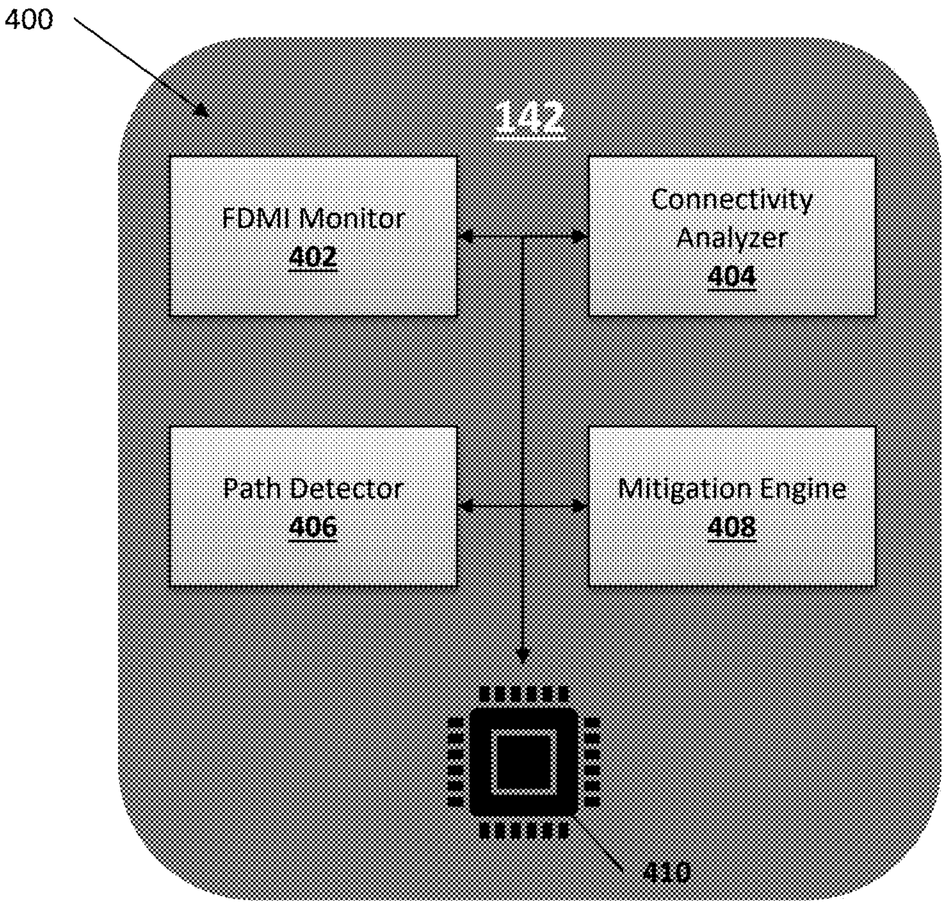
FIG. 4 is a block diagram of a controller in accordance with embodiments of the present disclosure.

Regarding FIG. 4, a controller 142 can include hardware, logic, and circuitry that obtains and analyzes Fabric Device Management Interface (FDMI) metadata from switches to identify relationships between virtual WWNs and physical HBA ports while monitoring connectivity configurations and masking patterns to detect and mitigate potential issues like single points of failure and non-uniform masking.

In embodiments, the controller 142 can include an FDMI monitor 402 that continuously obtains and processes Fabric Device Management Interface metadata from switches in the storage network to maintain current information about connectivity configurations. The FDMI monitor 402 retrieves detailed metadata containing critical information about World Wide Names (WWNs), including their associations with physical HBA ports, operating system details, manufacturer information, model numbers, serial numbers, and port numbers.

Additionally, the FDMI monitor 402 establishes and maintains mappings between virtual WWNs and their corresponding physical HBA ports, storing this information in the controller's memory 410 for use by other system components. The FDMI Monitor's data collection enables the storage array to determine which WWNs belong to the same physical HBA port, providing essential visibility into the relationship between virtual and physical resources that were previously unavailable to storage administrators. Through continuous monitoring and updates of FDMI metadata, the FDMI monitor 402 provides the foundation for detecting configuration issues, particularly in environments where multiple virtual WWNs share the same physical HBA port through NPIV functionality.

In embodiments, the controller 142 can include a connectivity analyzer 404 that examines masking information in conjunction with FDMI metadata to evaluate and identify potential connectivity configuration issues in NPIV environments. Working with data provided by the FDMI monitor 402, the connectivity analyzer 404 analyzes how virtual WWNs from the same physical HBA port are masked to array ports, checking for scenarios where the cumulative number of masked array ports exceeds predetermined thresholds that could impact system performance.

The connectivity analyzer 404 can also evaluate masking patterns across virtual WWNs to identify non-uniform configurations. For example, the connectivity analyzer 404 can detect when one virtual WWN is masked to three array ports while another virtual WWN on the same physical port is only masked to two array ports, potentially creating uneven IO load distribution.

The connectivity analyzer 404 maintains awareness of masking relationships between virtual WWNs and array ports, particularly in large-scale environments with thousands of servers and virtual machines. It examines these relationships to ensure consistent masking patterns are maintained across virtual WWNs sharing the same physical HBA port, as variations in these patterns can lead to management complexity and potential performance issues.

Working alongside other controller components 400, the connectivity analyzer 404 provides critical input for system-wide configuration management. It helps identify situations where virtual WWNs from the same physical port are masked to different sets of array ports, which could create broader zoning configurations affecting system recovery time during SAN reconfigurations.

In embodiments, the controller 142 can include a path detector 406 that can identify potential connectivity issues by analyzing the relationships between virtual WWNs and physical HBA ports established through the FDMI metadata. The path detector 406 can detect single points of failure where multiple WWNs associated with the same physical HBA port create an illusion of redundant connectivity, even though all paths depend on a single physical connection.

In embodiments, the path detector 406 can monitor for fan-in conditions that could impact system performance. These conditions arise when multiple WWNs from a single physical port are masked to different array ports, potentially creating excessive load on the physical HBA port. For example, when virtual WWNs from the same physical port are masked to different sets of array ports (such as ports 1-3 for one WWN, ports 5-7 for another, and ports 200-400 for a third), the path detector 406 recognizes the potential for overwhelming the physical port's processing capabilities.

The path detector 406 works with the FDMI monitor 402 to maintain awareness of physical connectivity paths and their associated virtual WWNs. This enables the path detector 406 to identify situations where what appears to be redundant connectivity through multiple WWNs is dependent on a single physical connection. For instance, if a cable from the HBA to the switch gets broken, multiple WWNs would disappear simultaneously, revealing the underlying single point of failure.

Through continuous monitoring of connectivity patterns, the path detector 406 helps prevent configurations that could impact system reliability or performance, particularly in virtualized environments where multiple VMs share physical resources. Its analysis provides critical input to the mitigation engine 408 for initiating appropriate corrective actions when potential issues are identified.

In embodiments, the controller 142 can include a mitigation engine 408 that implements corrective actions based on configuration issues identified by other controller components 400. Upon receiving detection signals from the path detector 406 or connectivity analyzer 404, the mitigation engine 408 generates appropriate warning messages to alert system administrators about critical issues such as single points of failure conditions or non-uniform masking configurations that could impact system performance.

The mitigation engine 408 can also initiate remasking operations to establish uniform masking patterns across multiple WWNs associated with the same physical HBA port. When non-uniform masking is detected, such as in cases where different virtual WWNs from the same physical port are masked to varying numbers of array ports, the engine 408 can trigger corrective actions to standardize these configurations.

In embodiments, the mitigation engine 408 standardizes configurations by initiating remasking operations that establish uniform masking patterns across virtual WWNs sharing the same physical HBA port. When non-uniform masking is detected, such as when one virtual WWN is masked to three array ports while another virtual WWN on the same physical port is only masked to two array ports, the engine 408 can trigger corrections to ensure consistent masking.

In large organizations with thousands of servers and virtual machines, the engine 408 promotes conformity in masking configurations rather than allowing variations that could become unmanageable. For example, if a physical HBA port exports multiple virtual WWNs, the engine 408 works to ensure each WWN is masked to the same number of array ports to maintain consistent IO load distribution.

The standardization process considers the physical limitations of HBA ports to prevent fan-in conditions. When the engine 408 detects that virtual WWNs from the same physical port are masked to different sets of array ports (such as ports 1-3 for one WWN and ports 5-7 for another), it can initiate remasking to prevent the physical port from being overwhelmed by excessive IO load.

The engine's standardization approach aligns with the practical needs of large-scale environments where managing individual variations across thousands of WWNs would be impractical. It enforces uniform configurations that enable easier management and helps prevent scenarios where VMs could be impacted by uneven resource distribution or single points of failure.

The engine 408 is particularly valuable in large-scale environments with thousands of servers and virtual machines, where maintaining consistent configurations is crucial for system stability. The mitigation engine 408 helps enforce uniformity in masking patterns, which is essential for managing complex virtualized environments where multiple VMs share physical HBA ports through NPIV functionality.

Working with other controller components 400, the mitigation engine 408 helps prevent configurations that could lead to performance issues or system failures. For example, when fan-in conditions are detected where multiple WWNs from a single physical port are masked to different array ports, the engine 408 can initiate actions to redistribute the masking configuration to prevent excessive load on the physical HBA port.

The following text includes details of a method(s) or a flow diagram(s) per embodiments of this disclosure. For simplicity of explanation, each method is depicted and described as a set of alterable operations. Additionally, one or more operations can be performed in parallel, concurrently, or in a different sequence. Further, not all the illustrated operations are required to implement each method described by this disclosure.

Figure 5:
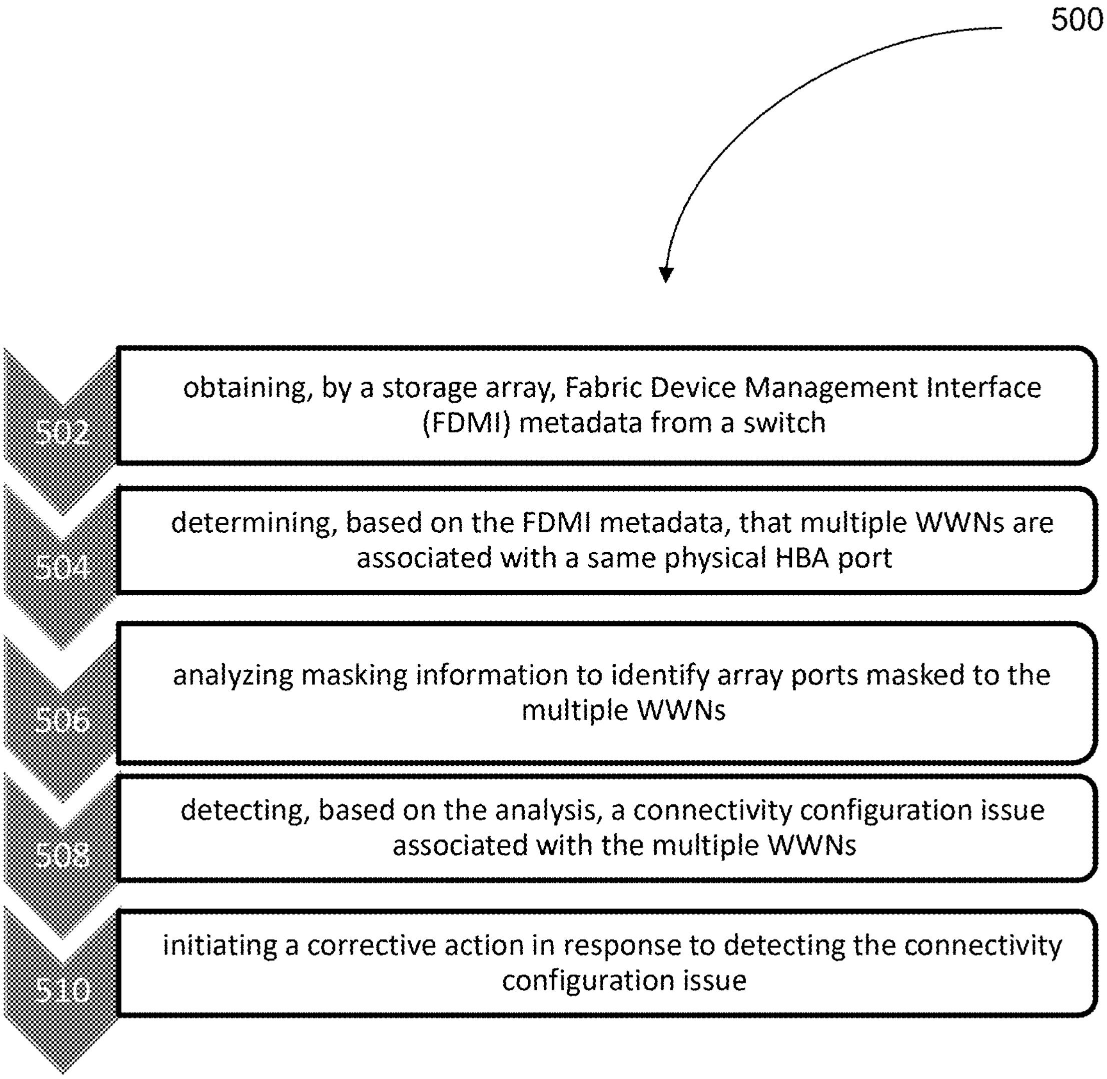
FIG. 5 is a flow diagram of a method for verifying port connectivity in storage environments per embodiments of the present disclosure.

Regarding FIG. 5, a method 500 relates to verifying port connectivity in storage environments. In embodiments, the controller 142 of FIG. 1 can perform all or a subset of operations corresponding to the method 500.

For example, the method 500, at 502, can include obtaining Fabric Device Management Interface (FDMI) metadata from a switch. The FDMI metadata can include information about World Wide Names (WWNs) associated with host bus adapter (HBA) ports. At 504, the method 500 can include determining, based on the FDMI metadata, that multiple WWNs are associated with a same physical HBA port. The method 500, at 506, can also include analyzing masking information to identify array ports masked to the multiple WWNs. Based on the analysis, the method 500, at 508, can include detecting a connectivity configuration issue associated with the multiple WWNs. Further, at 510, the method 500 can include initiating a corrective action in response to detecting the connectivity configuration issue.

Further, each operation can include any combination of techniques implemented by the embodiments described herein. Additionally, one or more of the storage array's components 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the steps of the method. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer with a display device enabling user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). For example, input from the user can be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer with a graphical user interface, a web browser through which a user can interact with an example implementation, or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise when computer programs run on the respective computers and have a client-server relationship. Further, the system can include a storage array(s) that delivers distributed storage services to the client(s) or server(s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (PDA) device, laptop computer, electronic mail device), or other communication devices. The browser device includes, for example, a computer (e.g., desktop computer, laptop computer) with a World Wide Web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:

obtaining, by a storage array, Fabric Device Management Interface (FDMI) metadata from a switch, wherein the FDMI metadata includes information about World Wide Names (WWNs) associated with host bus adapter (HBA) ports;

determining, based on the FDMI metadata, that multiple WWNs are associated with a same physical HBA port;

analyzing masking information to identify array ports masked to the multiple WWNs;

detecting, based on the analysis, a connectivity configuration issue associated with the multiple WWNs;

initiating a remasking operation to establish uniform masking across the multiple WWNs associated with the same physical HBA port; and initiating a corrective action in response to detecting the connectivity configuration issue.

2. The method of claim 1, further comprising:

determining that the multiple WWNs are masked to a number of array ports that exceed a predetermined threshold.

3. The method of claim 1, further comprising:

identifying a single point of failure (SPoF) condition where redundant connectivity appears to exist due to the multiple WWNs being associated with the same physical HBA port.

4. The method of claim 1, further comprising:

identifying non-uniform masking where different WWNs associated with the same physical HBA port are masked to different numbers of array ports.

5. The method of claim 1, further comprising:

identifying a fan-in condition where the multiple WWNs associated with the same physical HBA port are masked to multiple array ports creating excessive load on the physical HBA port.

6. The method of claim 1, further comprising:

generating a warning message indicating detection of a single point of failure condition.

7. The method of claim 1, further comprising:

determining a mapping between virtual WWNs and their corresponding physical HBA ports based on the FDMI metadata.

8. The method of claim 1, further comprising:

monitoring input/output (IO) operations from each WWN to track performance metrics for virtual machines sharing the same physical HBA port.

9. The method of claim 1, further comprising:

comparing masking configurations across multiple physical HBA ports to identify inconsistent masking patterns.

10. An apparatus with a memory and processor, the apparatus configured to:

obtain Fabric Device Management Interface (FDMI) metadata from a switch, wherein the FDMI metadata includes information about World Wide Names (WWNs) associated with host bus adapter (HBA) ports;

determine, based on the FDMI metadata, that multiple WWNs are associated with a same physical HBA port;

analyze masking information to identify array ports masked to the multiple WWNs;

detect, based on the analysis, a connectivity configuration issue associated with the multiple WWNs;

initiate a remasking operation to establish uniform masking across the multiple WWNs associated with the same physical HBA port; and initiate a corrective action in response to detecting the connectivity configuration issue.

11. The apparatus of claim 10, further configured to:

determine that the multiple WWNs are masked to a number of array ports that exceed a predetermined threshold.

12. The apparatus of claim 10, further configured to: identify a single point of failure (SPoF) condition where redundant connectivity appears to exist due to the multiple WWNs being associated with the same physical HBA port.

13. The apparatus of claim 10, further configured to: identify non-uniform masking where different WWNs associated with the same physical HBA port are masked to different numbers of array ports.

14. The apparatus of claim 10, further configured to: identify a fan-in condition where the multiple WWNs associated with the same physical HBA port are masked to multiple array ports creating excessive load on the physical HBA port.

15. The apparatus of claim 10, further configured to: generate a warning message indicating detection of a single point of failure condition.

16. The apparatus of claim 10, further configured to: determine a mapping between virtual WWNs and their corresponding physical HBA ports based on the FDMI metadata.

17. The apparatus of claim 10, further configured to: monitor input/output (IO) operations from each WWN to track performance metrics for virtual machines sharing the same physical HBA port.

18. The apparatus of claim 10, further configured to: compare masking configurations across multiple physical HBA ports to identify inconsistent masking patterns.

* * * * *